(12) United States Patent
Kanaoka et al.

(10) Patent No.: US 8,000,050 B2
(45) Date of Patent: Aug. 16, 2011

(54) MAGNETIC STORAGE CONTROL APPARATUS, MAGNETIC STORAGE CONTROL METHOD, AND MAGNETIC STORAGE APPARATUS

(75) Inventors: Toshikazu Kanaoka, Kawasaki (JP); Akihiro Itakura, Kawasaki (JP)

(73) Assignee: Toshiba Storage Device Corporation, Tokyo (JP)

( * ) Notice: Subject to any disclaimer, the term of this patent is extended or adjusted under 35 U.S.C. 154(b) by 216 days.

(21) Appl. No.: 12/413,516

(22) Filed: Mar. 28, 2009

(65) Prior Publication Data

US 2009/0244760 A1   Oct. 1, 2009

(30) Foreign Application Priority Data

Mar. 28, 2008   (JP) ................................ 2008-085370

(51) Int. Cl.
*G11B 5/09* (2006.01)
(52) U.S. Cl. ................................ 360/51; 360/31; 360/75
(58) Field of Classification Search ........................ None
See application file for complete search history.

(56) References Cited

U.S. PATENT DOCUMENTS

| | | | |
|---|---|---|---|
| 7,522,363 B2 * | 4/2009 | Abe et al. | 360/51 |
| 7,675,703 B2 * | 3/2010 | Albrecht et al. | 360/51 |
| 2004/0201913 A1 | 10/2004 | Sutardja | |

* cited by examiner

*Primary Examiner* — Jason Olson
(74) *Attorney, Agent, or Firm* — Greer, Burns & Crain, Ltd.

(57) ABSTRACT

A magnetic storage control apparatus for controlling a magnetic storage apparatus that uses a recording medium having a plurality of reference signals on its track and having a data area between the reference signals. The apparatus includes: a measurement section that reproduces the reference signal in a predetermined track of the recording medium and measures, for each data area, the time for a head to scan the data area to obtain a measurement value; a calculation section that calculates a setting value concerning the frequency of a recording clock used in data recording based on the measurement values of a plurality of data areas obtained by the measurement section; and a generation section that generates the recording clock based on the measurement values obtained by the measurement section and setting value calculated by the calculation section.

6 Claims, 7 Drawing Sheets

$$f_w = \frac{n}{k} f_r$$

MAGNETIC STORAGE CONTROL APPARATUS, MAGNETIC STORAGE CONTROL METHOD, AND MAGNETIC STORAGE APPARATUS

BACKGROUND OF THE INVENTION

1. Field of the Invention

The present invention relates to a magnetic storage control apparatus, a magnetic storage control method, and a magnetic storage apparatus that corrects a recording clock.

2. Description of the Related Art

A conventional hard disk drive uses a recording clock (fixed clock) having a previously-determined frequency to recording data in a medium. However, a slight variation in the linear velocity occurs in a track where recording is in progress due to influence of decentering (displacement between the central axis of a medium and central axis of a spindle). Therefore, in the case where recording is performed using the fixed clock, the frequency of data recorded in the medium does not become constant (in other words, recording bit length does not become constant). Thus, it is necessary to ensure an extra data area (buffer) in consideration of the displacement in the frequency. As a result, format efficiency (recording capacity) becomes low.

In order to correct the displacement in the frequency occurring due to influence of such decentering, there has been proposed an apparatus that measures the errors in the frequency and phase between respective servo sectors based on servo information and corrects the frequency based on the measured errors using a clock interpolator (refer to, e.g., Patent Document 1: U.S. Patent Application No. 2004/0201913).

When the error is fed back so as to correct the frequency and phase of the recording clock with respect to the decentering, a tracking error (group delay) occurs.

Further, when a method using a recording clock of a frequency that has previously determined for each servo sector is employed, the amount of displacement in the frequency becomes large at the latter part of the servo sector.

As described above, even if the correction is applied, it is impossible to eliminate the need to ensure a buffer due to occurrence of the displacement in the frequency of the recording clock, with the result that format efficiency cannot be improved.

SUMMARY OF THE INVENTION

The present invention has been made to solve the above problem, and an object thereof is to provide a magnetic storage control apparatus, a magnetic storage control method, and a magnetic storage apparatus capable of reducing the amount of error in the recording clock.

To solve the above problem, according to a first aspect of the present invention, there is provided a magnetic storage control apparatus for controlling a magnetic storage apparatus that uses a recording medium having a plurality of reference signals on its track and having a data area between the reference signals, including: a measurement section that reproduces the reference signal in a predetermined track of the recording medium and measures, for each data area, the time for a head to scan the data area to obtain a measurement value; a calculation section that calculates a setting value concerning the frequency of a recording clock used in data recording based on the measurement values of a plurality of data areas obtained by the measurement section; and a generation section that generates the recording clock based on the measurement values obtained by the measurement section and setting value calculated by the calculation section.

Further, according to a second aspect of the present invention, there is provided a magnetic storage control method for controlling a magnetic storage method that uses a recording medium having a plurality of reference signals on its track and having a data area between the reference signals, including: reproducing the reference signal in a predetermined track of the recording medium and measuring, for each data area, the time for a head to scan the data area to obtain a measurement value; calculating a setting value concerning the frequency of a recording clock used in data recording based on the measurement values of a plurality of data areas; and generating the recording clock based on the measurement values and calculated setting value.

Further, according to a third aspect of the present invention, there is provided a magnetic storage apparatus including: a recording medium having a plurality of reference signals on its track and having a data area between the reference signals; a head that records and reproduces data in/from the recording medium; a measurement section that reproduces the reference signal in a predetermined track of the recording medium and measures, for each data area, the time for a head to scan the data area to obtain a measurement value; a calculation section that calculates a setting value concerning the frequency of a recording clock used in data recording based on the measurement values of a plurality of data areas obtained by the measurement section; a generation section that generates the recording clock based on the measurement values obtained by the measurement section and setting value calculated by the calculation section; and a recording section that records data in the data area based on the recording clock generated by the generation section.

According to the disclosed magnetic storage control apparatus, magnetic storage control method, and magnetic storage apparatus, the amount of error in the recording clock can be reduced.

DETAILED DESCRIPTION OF THE PREFERRED EMBODIMENTS

Embodiments of the present invention will be described below with reference to the accompanying drawings.

First Embodiment

First, a configuration of a hard disk drive (magnetic storage apparatus) according to the present embodiment will be described.

Figure 1:
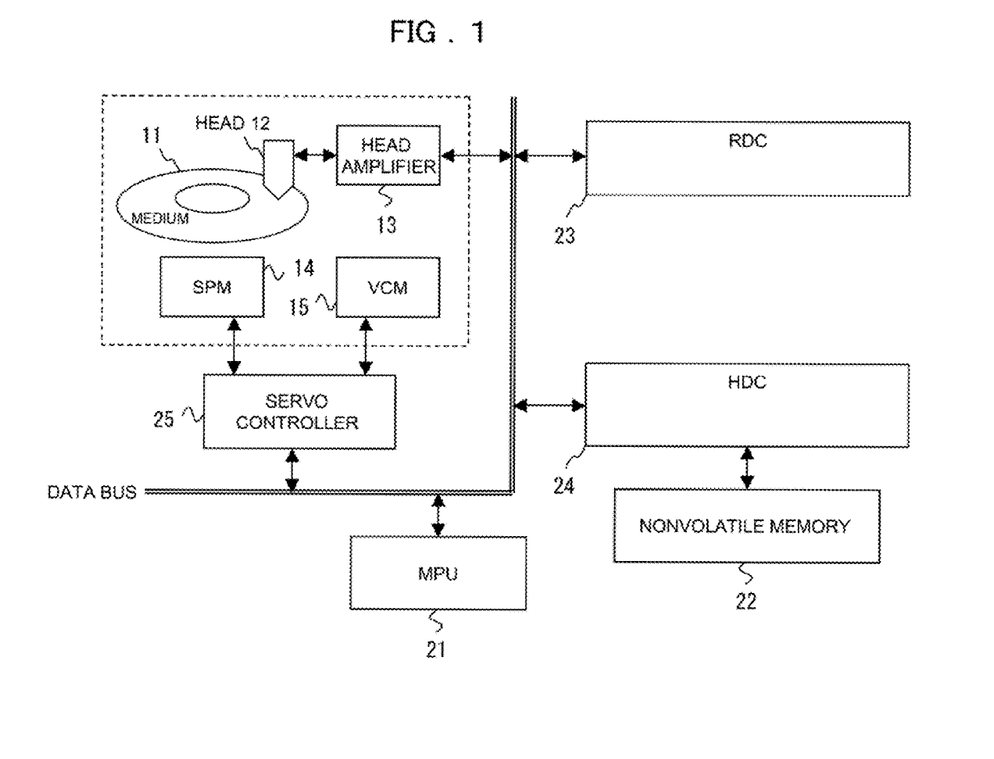
FIG. 1 is a block diagram showing an example of a configuration of a hard disk drive according to a first embodiment of the present invention.

FIG. 1 is a block diagram showing an example of a configuration of a hard disk drive according to the first embodiment. The hard disk apparatus shown in FIG. 1 has a medium 11 (recording medium), a head 12, a head amplifier 13, an SPM (Spindle Motor) 14, a VCM (Voice Coil Motor) 15, an MPU (Micro Processing Unit) 21, a nonvolatile memory 22, an RDC (Read Write Channel) 23, an HDC (Hard Disk Controller) 24, and a servo controller 25. The MPU 21, nonvolatile memory 22, RDC 23, HDC 24, servo controller 25, and head amplifier 13 are connected to one another via a data bus. A measurement section, a generation section, and a recording section correspond to the RDC 23. A calculation section corresponds to the HDC 24.

The RDC 23 has a recording synchronization function, a PRML (Partial Response Maximum Likelihood) function, a data coding function, and a data decoding function. The HDC 24 has an I/F control function, a buffer control function, a format control function, and an error correction function. The servo controller 25 controls the SPM 14 and VCM 15. The MPU 21 controls the RDC 23, HDC 24, and servo controller 25. The nonvolatile memory 22 stores a setting value and the like used by the HDC 24.

The head 12 reads out and writes data from/in the medium 11. The head amplifier 13 amplifiers a signal from the head 12 and a signal to be input to the head 12. The SPM 14 rotates the medium 11. The VCM 15 moves an arm on which the head 12 is mounted.

Recording clock frequency measurement processing according to the present embodiment will next be described.

A recording clock frequency is an optimum clock frequency for recording data of a predetermined length in a target servo sector.

Figure 2:
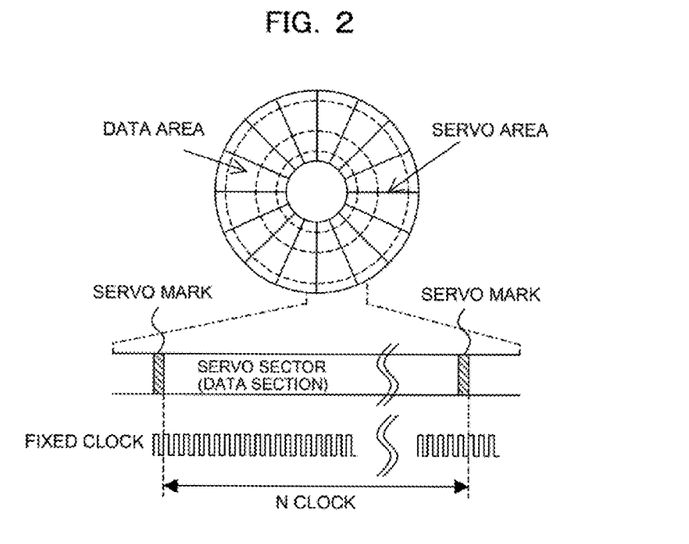
FIG. 2 is a conceptual view showing an example of recording clock frequency measurement processing according to the first embodiment.

FIG. 2 is a conceptual view showing an example of the recording clock frequency measurement processing according to the first embodiment. The upper part of FIG. 2 shows data areas and servo areas arranged on the medium 11. The servo areas, which are radially arranged, are areas each previously storing a servo mark (reference signal). The data areas, each of which is arranged between the servo areas, are areas in which data is recorded in the track direction. The lower part of FIG. 2 shows a timing chart of a read signal and a fixed clock output from the head 12 and head amplifier 13. The read signal includes a servo sector (data area) which is a data section between the servo marks.

Figure 3:
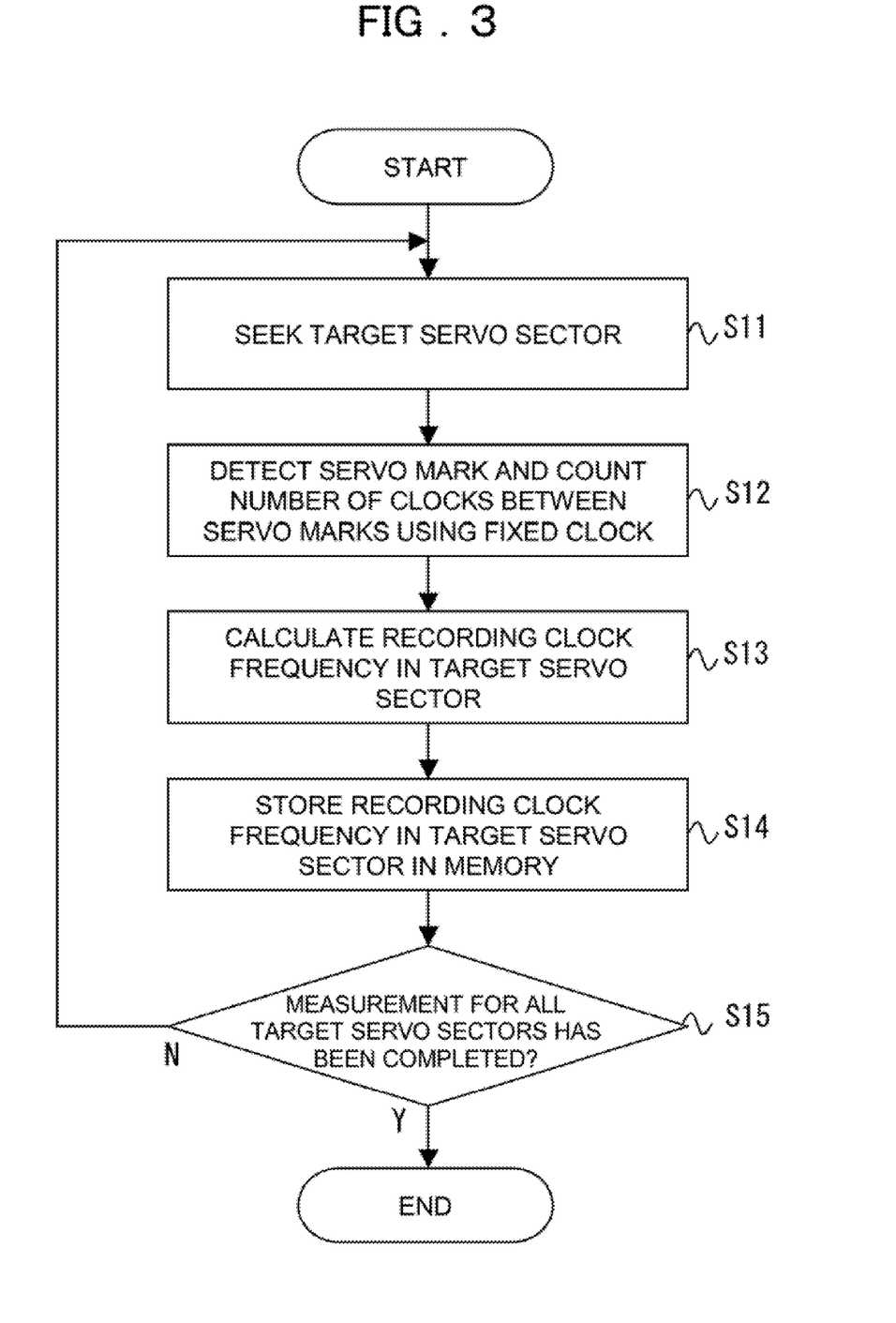
FIG. 3 is a flowchart showing an example of the recording clock frequency measurement processing according to the first embodiment.

FIG. 3 is a flowchart showing an example of the recording clock frequency measurement processing according to the first embodiment. The HDC 24 seeks a target servo sector (S11). Then, the RDC 23 detects the servo mark previously recorded in the medium 11 from the read signal and measures a servo sector interval. With this operation, the RDC 23 can measure a frequency change on the medium 11 which is caused due to decentering. A measurement method of the servo sector interval is to prepare a clock (fixed clock) of a fixed frequency is prepared and count the number of clocks in the servo sector interval (S12).

Figure 4:
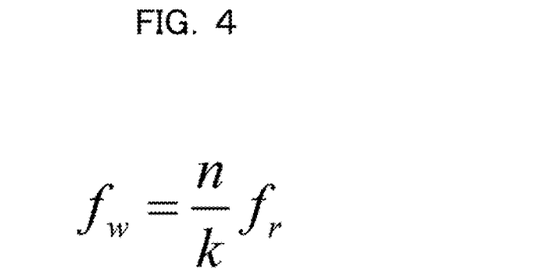
FIG. 4 is a view showing an example of a calculation formula of a recording clock frequency according to the first embodiment.

The HDC 24 calculates the recording clock frequency in a target servo sector from a specified value and measurement value of the servo sector interval (S13) and stores the calculated recording clock frequency in the nonvolatile memory 22 as a preset value (S14). FIG. 4 is a view showing an example of a calculation formula of the recording clock frequency according to the first embodiment. In this formula, fw is recording clock frequency, fr is fixed clock frequency, n is the number of bits recorded in the servo sector, and k is the count number of clocks between the servo marks measured by the fixed clock. The preset value may be written in a system area on the medium 11.

The HDC 24 then determines whether the measurement for all the target servo sectors has been completed or not (S15). When determining that the measurement has not been completed (N in S15), the HDC 24 returns to S11 and performs the measurement for the next target servo sector. When determining that the measurement has been completed (Y in S15), the HDC ends this flow.

The HDC 24 performs the recording clock frequency measurement processing at the shipping time or at the initial write time. Further, the HDC 24 performs the recording clock frequency measurement processing at power-on time, after a predetermined time has elapsed from power-on, or after detection of a large shock (because the decentering condition is changed due to the shock) so as to update the recording clock frequency.

Recording clock correction processing according to the present embodiment will next be described.

Figure 5:
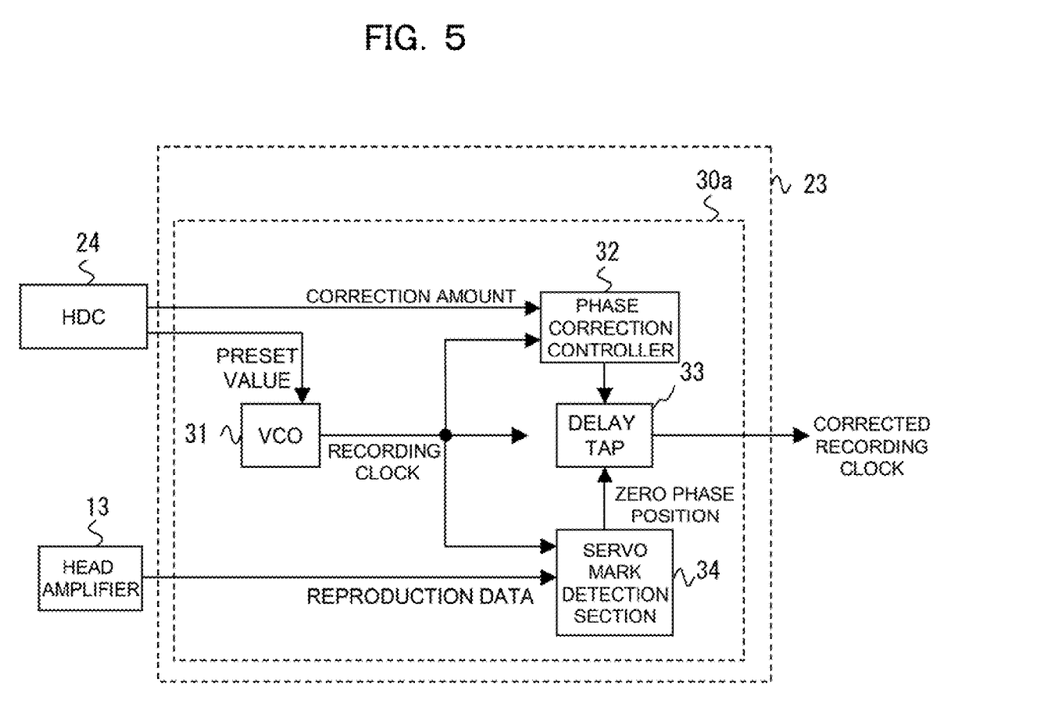
FIG. 5 is a block diagram showing an example of a configuration of a recording clock correction section 30*a* according to the first embodiment.
Figure 6:
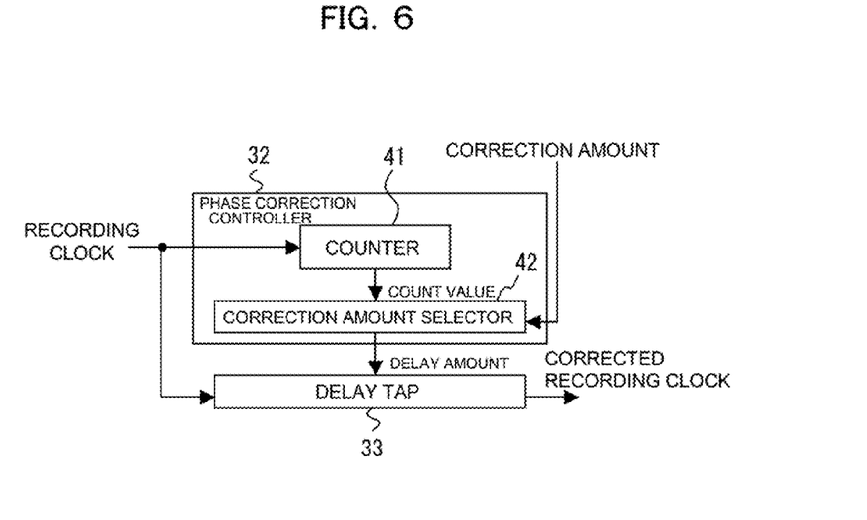
FIG. 6 is a block diagram showing an example of a configuration of a phase correction control section 32 according to the first embodiment.

The RDC 23 has a recording clock correction section 30a. FIG. 5 is a block diagram showing an example of a configuration of the recording clock correction section 30a according to the first embodiment, the recording clock correction section 30a has a VCO (Voltage Controlled Oscillator) 31, a phase correction controller 32, a delay tap 33, and a servo mark detection section 34. FIG. 6 is a block diagram showing an example of a configuration of the phase correction control section 32 according to the first embodiment. The phase correction controller 32 has a counter 41 and a correction amount selector 42.

Figure 7A:
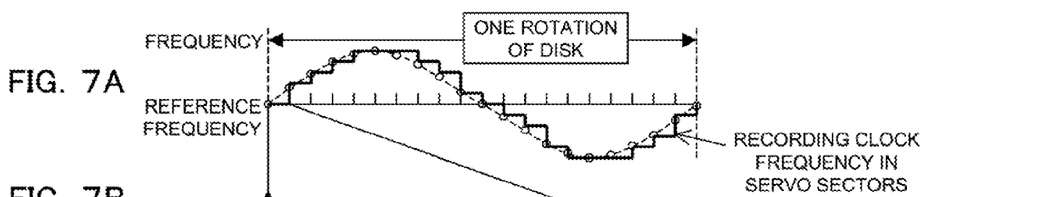
FIGS. 7A to 7C are conceptual views showing an example of recording clock correction processing according to the first embodiment.
Figure 7B:
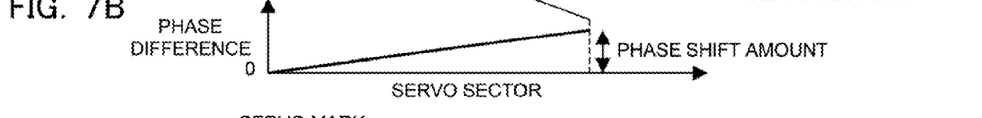
Figure 7C:
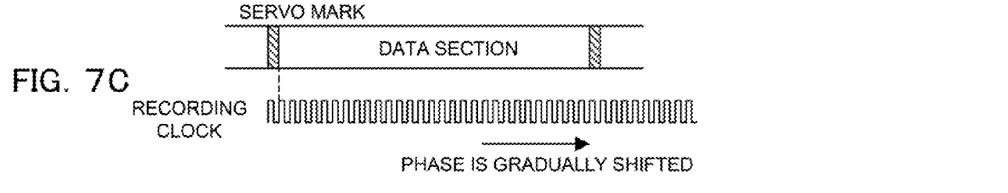

FIGS. 7A to 7C are conceptual views showing an example of recording clock correction processing according to the first embodiment. FIG. 7A shows a shift of the recording clock frequency in servo sectors corresponding to one rotation of a disk. FIG. 7B shows a relationship between a position in one servo sector and phase difference. FIG. 7C shows the timing chart of the above one servo sector and recording clock.

Figure 8:
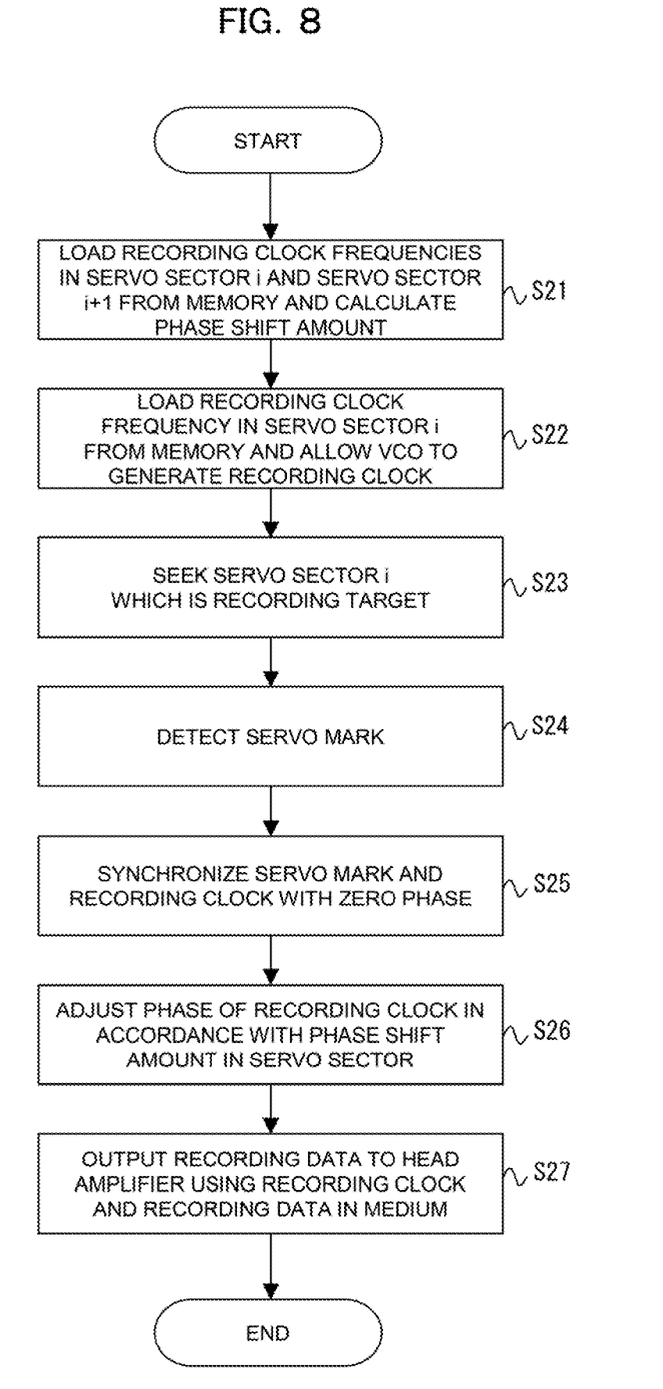
FIG. 8 is a flowchart showing an example of the recording clock correction processing according to the first embodiment.

FIG. 8 is a flowchart showing the recording clock correction processing according to the first embodiment. First, the HDC 24 loads preset values of the recording clock frequency in servo sectors i and i+1 from the nonvolatile memory 22, calculates a recording clock frequency difference between the adjacent servo sectors to obtain the amount of phase shift in one servo sector (S21). The HDC 24 loads the preset value of the recording clock frequency in the servo sector i from the nonvolatile memory 22 and supplies the recording clock frequency to the VCO 31 so as to allow the VCO 31 to output a recording clock of a desired recording clock frequency (S22).

The HDC 24 then seeks the servo sector i which is a recording target servo sector (S23). Then, the servo mark detection section 34 detects a servo mark (zero phase position) from a read signal obtained by the head amplifier 13 and outputs the detected servo mark to the phase correction controller 32 (S24).

At the data recording time, the HDC 24 starts recording operation using the loaded preset value of the recording clock frequency in the servo sector. At this time, servo mark detection section 34 detects the servo mark reproduced by a reproduction head of the head 12 and synchronizes the recording clock with the zero phase (S25).

Then, the phase correction controller 32 controls the delay tap 33 in accordance with the phase shift amount in the servo sector to adjust the phase of the recording clock (S26). The phase correction controller 32 activates the counter 41 using the recording clock, sequentially selects at a specified timing the correction amount received from the HDC 24, and loads the selected correction amount to the delay tap 33. The specified timing is obtained by equally dividing, e.g., the period of the servo sector. The counter 41 is reset by using the timing at which the servo mark detection section 34 detects the zero phase position as a trigger. The delay tap 33 shifts the phase of the recording clock in accordance with the delay amount supplied from the phase correction controller 31. The recording clock is phase-corrected by the delay tap 33 and is output as a corrected recording clock.

Then, the RDC 23 uses the corrected recording clock to output recording data to the head amplifier 13, records data in the medium 11 by means of the head 12 (S27), and this flow is ended.

According to the present embodiment, it is possible to calculate the phase shift amount in a recording target servo sector based on a difference between the recording clock frequency measured in the recording target servo sector and recording clock frequency measured in a servo sector next to the recording target servo sector. Further, by using the shift amount to correct the phase of the recording clock at a plurality of timings in the servo sector, it is possible to make the error of the recording clock smaller than in the case where the correction is made once for each servo sector.

Second Embodiment

A hard disk drive (magnetic storage apparatus) according to the present embodiment has the same configuration as that of the first embodiment except that the RDC 23 has a clock correction section 30b in place of the recording clock correction section 30a. The recording clock frequency measurement processing according to the present embodiment is the same as the first embodiment.

The recording clock correction processing according to the present embodiment will be described.

Figure 9:
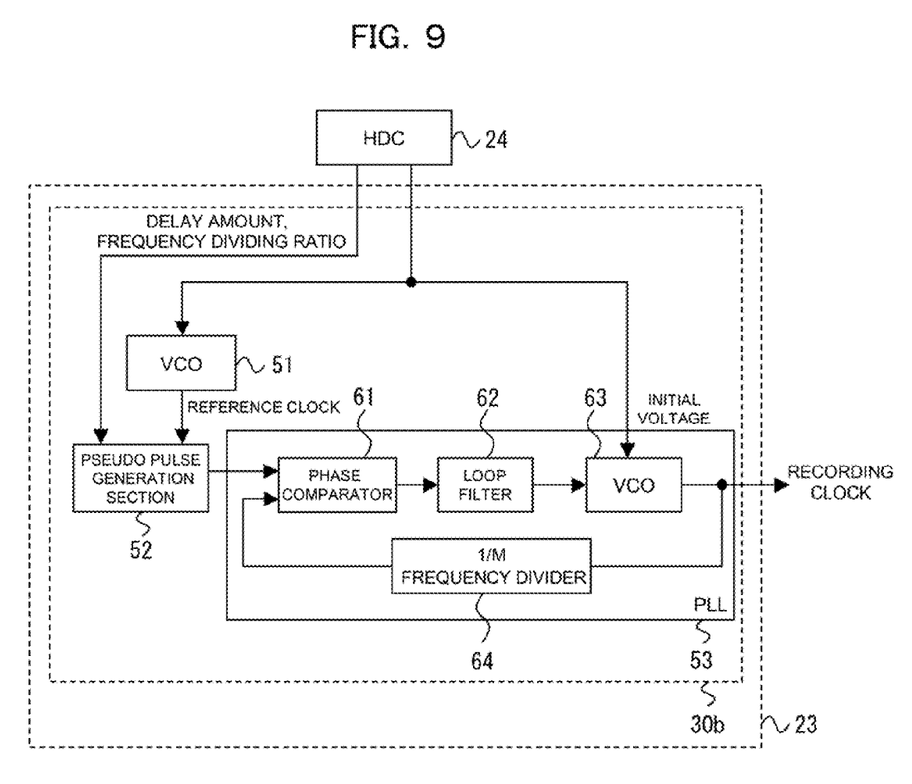
FIG. 9 is a block diagram showing an example of a configuration of a recording clock correction section 30*b* according to a second embodiment of the present invention.
Figure 10:
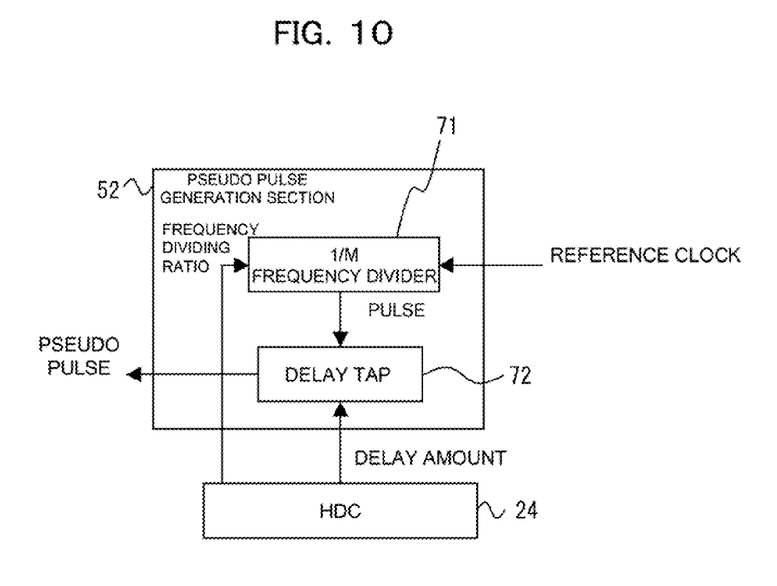
FIG. 10 is a block diagram showing an example of a configuration of a pseudo pulse generation section 52 according to the second embodiment.

FIG. 9 is a block diagram showing an example of a configuration of a recording clock correction section 30b according to the second embodiment of the present invention. The recording clock correction section 30b has a VCO 51, a pseudo pulse generation section 52, and a PLL (Phase-locked loop) 53. The PLL 53 has a phase comparator 61, a loop filter 62, a VCO 63, a 1/M frequency divider 64. FIG. 10 is a block diagram showing an example of a configuration of the pseudo pulse generation section 52 according to the second embodiment. The pseudo pulse generation section 52 has a 1/M frequency divider 71 and a delay tap 72.

Figure 11:
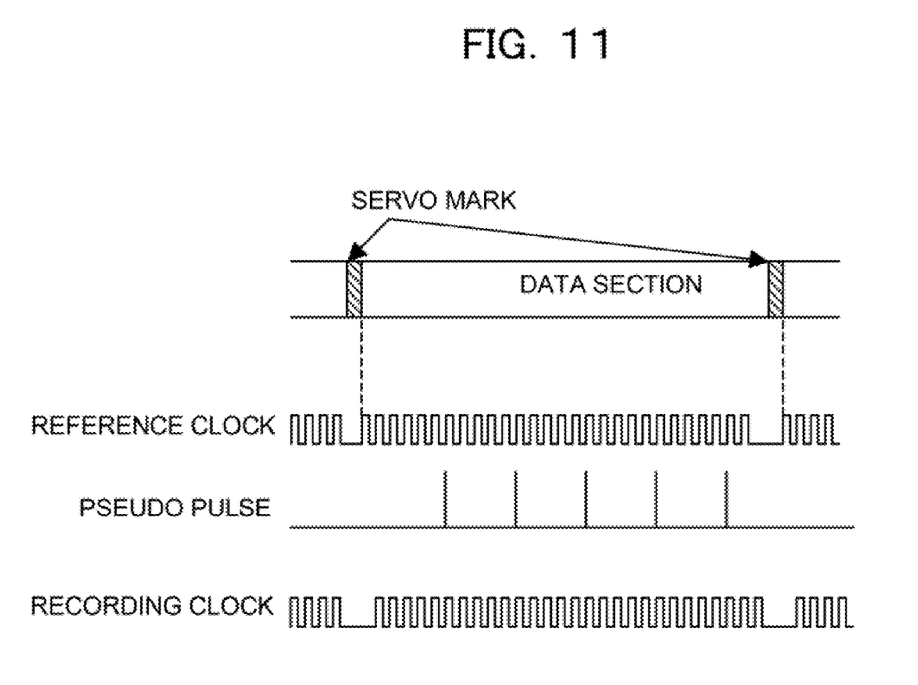
FIG. 11 is a timing chart showing an example of recording clock correction processing according to the second embodiment.

FIG. 11 is a timing chart showing an example of the recording clock correction processing according to the second embodiment. This timing chart shows the timing relationship among the servo sector, reference clock, pseudo pulse, and recording clock.

First, as in the case of the first embodiment, the RDC 23 uses the reproduction head of the head 12 to perform reproduction and detection of the servo mark and synchronizes the reference clock and recording clock with the zero phase. Then, based on the reference clock, the pseudo pulse generation section 52 generates a pseudo pulse at the timing (position and phase) specified by the HDC 24. Although the recording clock is set to have the same frequency as the reference clock in the initial stage, it is synchronized with the pseudo pulse by the PLL 53. As a result, a corrected recording clock having a frequency and phase corresponding to the phase correction amount can be generated.

As in the case of the first embodiment, the HDC 24 loads a preset value of a recording target servo sector from the non-volatile memory 22. The HDC 24 then supplies a voltage corresponding to the preset value to the VCO 51 and VCO 63. The VCO 51 and VCO 63 each output the reference clock and recording clock. Further, the HDC 24 calculates the phase shift amount in the servo sector as in the case of the first embodiment. The HDC 24 then calculates the delay amount and frequency dividing ratio M based on the phase shift amount and supplies the calculated delay amount and frequency dividing ratio M to the pseudo pulse generation section 52. The pseudo pulse generation section 52 generates a pseudo pulse from the delay amount and frequency dividing ratio M received from the HDC 24 and reference clock. The generated pseudo pulse is input to the PLL 53.

The phase comparator 61 compares the pseudo pulse and a feedback pulse generated by the 1/M frequency divider 64 and outputs the phase difference between them. The loop filter 62 outputs a correction voltage value for the VCO 63 based on the phase difference. The frequency dividing ratio 1/M of the 1/M frequency divider 64 is an interval at which the pseudo pulse is generated in the servo sector.

The HDC 24 supplies the frequency dividing ratio and delay amount to the pseudo pulse generation section 52. The reference clock is input to the 1/M frequency divider 71, and delay amount is input to the delay tap 72. The pulse generated by the 1/M frequency divider 71 based on the reference clock is delayed by the delay tap 72 to be the pseudo pulse.

According to the present embodiment, by correcting the frequency and phase of the recording clock at a plurality of timings in the servo sector, it is possible to make the error of the recording clock smaller than in the case where the correction is made once for each servo sector.

Further, according to the above embodiments, by measuring and retaining the recording clock frequency and correcting the recording clock varied in the servo sector based on the retained recording clock frequency, the error can be made small in the correction of frequency variation caused due to decentering. Further, by making the length of data to be recorded always equal to the size of a recording area on the medium, it is possible to eliminate the need to ensure an extra data area, thereby improving format efficiency.

There is known a bit-patterned medium as a magnetic storage system which has gotten a lot of attention recently. On the bit-patterned medium, recording bits are previously formed in a recording area as isolated dots, and one bit data is recorded and reproduced in/from each dot. Therefore, the displacement in the recording frequency due to decentering may directly cause a recoding failure (drop off, insertion, erroneous recording). When the above embodiments are applied to the bit-patterned medium, data can reliably recoded and reproduced in/from the dot.

The present invention can be embodied in various forms, without departing from the spirit or the main feature. Therefore, the aforementioned embodiments are merely illustrative of the invention in every aspect, and not limitative of the same. The scope of the present invention is defined by the appended claims, and is not restricted by the description herein set forth. Further, various changes and modifications to be made within the scope of the appended claims and equivalents thereof are to fall within the scope of the present invention.

What is claimed is:

1. A magnetic storage control apparatus for controlling a magnetic storage apparatus that uses a recording medium having a plurality of reference signals on its track and having a data area between the reference signals, comprising:
   a measurement section that reproduces the reference signal in a predetermined track of the recording medium and measures, for each data area, the time for a head to scan the data area to obtain a measurement value;
   a calculation section that calculates a setting value concerning the frequency of a recording clock used in data recording based on the measurement values of a plurality of data areas obtained by the measurement section; and
   a generation section that generates the recording clock based on the measurement values obtained by the measurement section and setting value calculated by the calculation section, wherein
   the generation section sets the frequency of the recording clock based on the measurement values obtained by the measurement section and adjusts the delay of the recording clock based on the setting value calculated by the calculation section,
   the calculation section calculates the setting value corresponding to a plurality of timings in the data area, and
   the generation section adjusts, at each of the plurality of timings, the delay of the recording clock based on the setting value corresponding to the timing.

2. A magnetic storage control apparatus for controlling a magnetic storage apparatus that uses a recording medium having a plurality of reference signals on its track and having a data area between the reference signals, comprising:
   a measurement section that reproduces the reference signal in a predetermined track of the recording medium and measures, for each data area, the time for a head to scan the data area to obtain a measurement value;
   a calculation section that calculates a setting value concerning the frequency of a recording clock used in data recording based on the measurement values of a plurality of data areas obtained by the measurement section; and
   a generation section that generates the recording clock based on the measurement values obtained by the measurement section and setting value calculated by the calculation section,
   wherein the generation section generates a plurality of pulses in the data area based on the measurement value obtained by the measurement section and synchronizes the recording clock with the generated pulses.

3. A magnetic storage control method for controlling a magnetic storage method that uses a recording medium having a plurality of reference signals on its track and having a data area between the reference signals, comprising:
   reproducing the reference signal in a predetermined track of the recording medium and measuring, for each data area, the time for a head to scan the data area to obtain a measurement value;
   calculating a setting value concerning the frequency of a recording clock used in data recording based on the measurement values of a plurality of data areas; and
   generating the recording clock based on the measurement values and calculated setting value, wherein
   the frequency of the recording clock is set based on the measurement values, and the delay of the recording clock is adjusted based on the calculated setting value,
   the setting value corresponding to a plurality of timings in the data area is calculated, and
   the delay of the recording clock is adjusted at each of the plurality of timings based on the setting value corresponding to the timing.

4. A magnetic storage control method for controlling a magnetic storage method that uses a recording medium having a plurality of reference signals on its track and having a data area between the reference signals, comprising:
   reproducing the reference signal in a predetermined track of the recording medium and measuring, for each data area, the time for a head to scan the data area to obtain a measurement value;
   calculating a setting value concerning the frequency of a recording clock used in data recording based on the measurement values of a plurality of data areas; and
   generating the recording clock based on the measurement values and calculated setting value,
   wherein a plurality of pulses are generated in the data area based on the measurement value, and the recording clock is synchronized with the generated pulses.

5. A magnetic storage apparatus comprising:
   a recording medium having a plurality of reference signals on its track and having a data area between the reference signals;
   a head that records and reproduces data in/from the recording medium;
   the magnetic storage control apparatus of claim 1; and
   a recording section that records data in the data area based on the recording clock generated by the generation section.

6. A magnetic storage apparatus comprising:
   a recording medium having a plurality of reference signals on its track and having a data area between the reference signals;
   a head that records and reproduces data in/from the recording medium;
   the magnetic storage control apparatus of claim 2; and
   a recording section that records data in the data area based on the recording clock generated by the generation section.

* * * * *